US008256727B2

(12) United States Patent
Hiester et al.

(10) Patent No.: US 8,256,727 B2
(45) Date of Patent: Sep. 4, 2012

(54) MODULAR CASKET HARDWARE

(75) Inventors: James D. Hiester, Bluffton, IN (US); Mike McKinley, Alexandria, IN (US); Richard Foster, Union City, IN (US); DeWayne Acree, Fort Wayne, IN (US)

(73) Assignee: W&M Manufacturing, Inc., Portland, IN (US)

( * ) Notice: Subject to any disclaimer, the term of this patent is extended or adjusted under 35 U.S.C. 154(b) by 345 days.

(21) Appl. No.: 12/697,848

(22) Filed: Feb. 1, 2010

(65) Prior Publication Data

US 2010/0270449 A1 Oct. 28, 2010

Related U.S. Application Data

(60) Provisional application No. 61/149,124, filed on Feb. 2, 2009.

(51) Int. Cl.
*F16L 3/08* (2006.01)

(52) U.S. Cl. .......... 248/213.2; 27/10; 248/305; 248/313

(58) Field of Classification Search ............... 248/213.2, 248/230.1, 251, 305, 313, 205.1, 207, 220.21, 248/200; 27/10, 227; 16/424, 439; 52/287
See application file for complete search history.

(56) References Cited

U.S. PATENT DOCUMENTS 4,267,623 A * 5/1981 Christian ............................ 27/2
5,008,990 A 4/1991 Craft
5,144,727 A 9/1992 Craft
5,377,395 A 1/1995 Maier et al.
5,519,923 A 5/1996 Rojdev et al.
5,531,000 A 7/1996 Biondo
5,555,612 A 9/1996 Biondo
5,604,965 A 2/1997 Shaw et al.
5,875,529 A * 3/1999 Ollier .................................. 27/6
6,101,692 A 8/2000 Linville et al.
6,317,945 B1 11/2001 Laphan et al.
2005/0050700 A1* 3/2005 Davis et al. ........................ 27/10
2007/0130737 A1* 6/2007 De La Fuente et al. ............ 27/2

* cited by examiner

*Primary Examiner* — Ramon Ramirez
(74) *Attorney, Agent, or Firm* — Barnes & Thornburg LLP

(57) ABSTRACT

Modular casket hardware which includes a bracket configured to attach to a casket corner wall surface. The bracket is also configured to be oriented with respect to the casket in a first orientation to attach to the casket wall and a second orientation to attach to the casket corner. A bore in the bracket is configured to receive a casket bar when in the first orientation. Tabs on the bracket are configured to at least partially fit within a portion of the casket bar when the bracket is oriented in the second orientation. A bracket cover could also use other bracket type mechanisms to attach and hold the casket bars to the casket which will support the required weight of a casket at the grave site. Once a bracket and bars are attached, the casket will be able to be shipped without the decorative bracket cover installed. The decorative modular casket bracket cover will be able to be added to the casket at any time.

9 Claims, 15 Drawing Sheets

MODULAR CASKET HARDWARE

RELATED APPLICATIONS

The present application is related to and claims priority to U.S. Provisional Patent Application Ser. No. 61/149,124, filed on Feb. 2, 2009, entitled Modular Casket Hardware. To the extent not included below, the subject matter disclosed in those applications is hereby expressly incorporated into the present application

TECHNICAL FIELD AND SUMMARY

The present disclosure relates to stationary casket hardware used on caskets. Stationary hardware is attached to the casket and the hardware and/or bars do not move. The disclosure does not relate to casket hardware where the bars swing up when lifted which is commonly referred to as "swing bar casket hardware."

A traditional casket is roughly 80" long by 29" wide. Typically, hand rails, handles or "bars" fasten to the sides and ends of the casket via casket hardware. These bars allow the manufacturer to handle and move the casket during production and during transportation of the casket. Similarly, funeral homes use them for moving the casket during funeral services.

The bars slide into the casket hardware which fastens to the casket with screws or bolts. There are typically three or four casket hardware pieces on the long side of the casket, none or one hardware piece on each short side, and 4 corner pieces. This casket hardware includes both decorative and functional aspects. In particular, the hardware is load bearing, supporting the bars and the casket. In addition, any casket produced at the manufacturer has a specific set of hardware on it of a particular color, shape and configuration for different decorative, customization or personalization options. The hardware cannot be changed after installed without extensive rework due to different hole locations/patterns for different hardware styles on the casket. The particular hardware configuration, extensive rework, and the additional handling makes changing the hardware not cost effective.

This present disclosure is comprised of a modular casket hardware which utilizes a bracket that carries the hand rails both at the sides and the corners of the casket. The bracket illustratively accommodates both side and corner fastener patterns. When using the bracket in one orientation it can be used on the side as a lug, where the bar actually extends through a hole in the bracket carrying the bar. The bracket can also be reoriented to use on the corner of the casket. Illustratively, the bars will fit over the tabs extending from the bracket and carry the bars. The weight of the casket, therefore, will rest on the brackets when being carried.

This disclosure also comprises bracket mechanisms that will attach the casket bars to the casket for functional support. This will also allow decorative modular casket bracket covers to be added at a later point in time and along any point in the supply chain. The casket can be produced, moved and/or shipped with only the brackets and bars installed. Illustratively, the modular casket hardware can attach to the bracket and/or casket over the bars shrouding the bracket from view for decorative appearance. The modular casket hardware may illustratively comprise any design or color, and snap or otherwise fasten onto the bracket and/or casket.

The modular casket hardware may be added later depending on the customer's choice. The modular casket hardware can then be attached to the casket at a distribution center or even at the funeral home rather than at the manufacturer. The modular casket hardware will allow customization at any point in the supply chain up to and including the end point of sale. With a variety of styles and colors of decorative hardware possible, the customer can get the desired custom look from a generic casket. For example, a manufacturer can assemble a silver casket and attach a silver bar. This casket can be shipped to a funeral home where a consumer can choose endless varieties of colors and styles of modular casket hardware to attach to the casket. The modular casket hardware allows manufacturer, distribution centers and/or funeral homes to carry significantly lower inventory levels of generic caskets while having the ability to customize for their customer.

Furthermore, using the bracket will allow caskets to be shipped with only the brackets holding the bars through the entire supply chain. This allows the ability to add the modular casket hardware at any point in the supply chain. In addition, it eliminates the possibility of damaging and/or scratching the decorative hardware during assembly and shipment of the casket.

The modular casket hardware will also improve the overall appearance of the casket by eliminating screws/bolts which are normally visible on conventional load-bearing decorative hardware. Furthermore, the screws/bolts used to attach the hardware to the casket will no longer need to have decorative finishes since it will be covered with a decorative piece. In an embodiment, non-load-bearing decorative hardware can snap onto a bracket, around the bar, and/or onto the casket itself.

Utilizing the modular casket hardware and the use of the standard bracket, the casket bars can be manufactured to a standard length. Without the modular casket hardware, the bars are different sizes since the hardware is different sizes and fits differently. Therefore, the modular casket hardware using the standard bracket will allow the manufacturer to standardize the bar lengths for every style of customization.

An illustrative embodiment of the present disclosure provides modular casket hardware which comprises a standard bracket. This bracket is configured to attach to a casket corner and/or a casket side and configured to engage and support a casket bar. The bracket includes first and second tabs each spaced apart from each other and each positioned non-parallel to each other. The first and second tabs each have a body configured to at least partially fit inside a portion of the casket bar. The bracket includes a bore formed between the first and second tabs and disposed through the bracket. The bore has a periphery separating the first and second tabs. The bore is sized to receive the casket bar such that the casket bar is extendable through one side of the bracket and to the other. First and second flanges are spaced apart from the bore and include a casket wall attachment surface. Each wall attachment surface is positioned co-linear to the other wall attachment surface. Both wall attachment surfaces are configured to permit the bracket to attach to the casket wall surface. First and second flanges include receptacles configured to receive a fastener to attach the bracket to the casket wall surface. Third and fourth flanges are spaced apart from the bore as well. Each of the third and fourth flanges includes a casket corner attachment surface. As such, the corner attachment surface of the third flange angularly abuts the corner attachment surface of fourth flange and the wall attachment surface of the first flange. The casket corner attachment surface of the fourth flange angularly abuts the wall attachment surface of the second flange. The casket corner attachment surfaces of the third and fourth flange abut each other at about a 90 degree angle forming a cavity. The cavity is configured to receive the casket corner. The third and fourth flanges include receptacles each configured to receive a fastener to attach the bracket to the casket corner. The bracket is also configured to be oriented with respect to the casket in a first orientation to attach to the casket wall and a second orientation, which is about perpendicular to the first orientation, to attach to the casket corner. The bore in the bracket is configured to receive a casket bar when in the first orientation. The tabs are also configured to at least partially fit within a portion of the casket bar when the bracket is oriented in the second orientation.

In the above and other illustrative embodiments, the casket hardware may further comprise: the bracket being a monolithic molded or other similar fabricated/processed part; the bracket being made from polycarbonate or other structurally sound plastics or even out of metal; the first, second, third, and fourth flanges each further comprising at least one brace to add structural integrity to the bracket; a bracket cover assembly which includes a face plate with or without a back filler portion; wherein the face plate to fit over the bracket and a portion of at least one casket bar.

Another illustrative embodiment of the present disclosure provides modular casket hardware which comprises a bracket and a bracket cover assembly. The bracket is configured to attach to a casket corner and a casket wall surface and configured to engage and support a casket bar. The bracket includes first and second tabs each spaced apart from each other and each positioned non-parallel to each other. The first and second tabs each have a body configured to at least partially fit inside a portion of the casket bar. The bracket includes a bore formed between the first and second tabs and disposed through the bracket. The bore has a periphery separating the first and second tabs. The bore is sized to receive the casket bar such that the casket bar is extendable through one side of the bracket and to the other. First and second flanges are spaced apart from the bore and include a casket wall attachment surface. Each wall attachment surface is positioned co-linear to the other wall attachment surface. Both wall attachment surfaces are configured to permit the bracket to attach to the casket wall surface. First and second flanges include receptacles configured to receive a fastener to attach the bracket to the casket wall surface. Third and fourth flanges are spaced apart from the bore as well. Each of the third and fourth flanges includes a casket corner attachment surface. As such, the corner attachment surface of the third flange angularly abuts the corner attachment surface of fourth flange and the wall attachment surface of the first flange. The casket corner attachment surface of the fourth flange angularly abuts the wall attachment surface of the second flange. The casket corner attachment surfaces of the third and fourth flange abut each other at about a 90 degree angle forming a cavity. The cavity is configured to receive the casket corner. The third and fourth flanges include receptacles each configured to receive a fastener to attach the bracket to the casket corner. The bracket is also configured to be oriented with respect to the casket in a first orientation to attach to the casket wall and a second orientation, which is about perpendicular to the first orientation, to attach to the casket corner. The bore in the bracket is configured to receive a casket bar when in the first orientation. The tabs are also configured to at least partially fit within a portion of the casket bar when the bracket is oriented in the second orientation. The bracket cover assembly which includes a face plate with or without a back filler portion. The face plate fits over the bracket and a portion of at least one casket bar. The face plate includes an opening to receive at least a portion of at least one casket bar. The back filler portion, if desired for visual appearance, is configured to fit adjacent the face plate and at least a portion of the casket bar.

In the above and other illustrative embodiments, the casket hardware may further comprise: the face plate including a plurality of axially aligned openings, and each configured to receive at least a portion of at least one casket bar.

The modular casket hardware can also be accomplished with two separate styles of brackets for the sides and corners. The modular casket hardware provides the ability to manufacture and transport caskets with a bracket that holds a stationary bar to a casket with the ability to add decorative pieces to cover the brackets. Again, the decorative modular casket bracket cover can be added at any point along the supply chain including but not limited to the manufacturing, distribution and funeral homes.

Additional features and advantages of the modular casket hardware will become apparent to those skilled in the art upon consideration of the following detailed descriptions exemplifying the best mode of carrying out the modular casket hardware as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the modular casket hardware, and such exemplification is not to be construed as limiting the scope of the modular casket hardware in any manner.

DETAILED DESCRIPTION OF THE DRAWINGS

Figure 1:
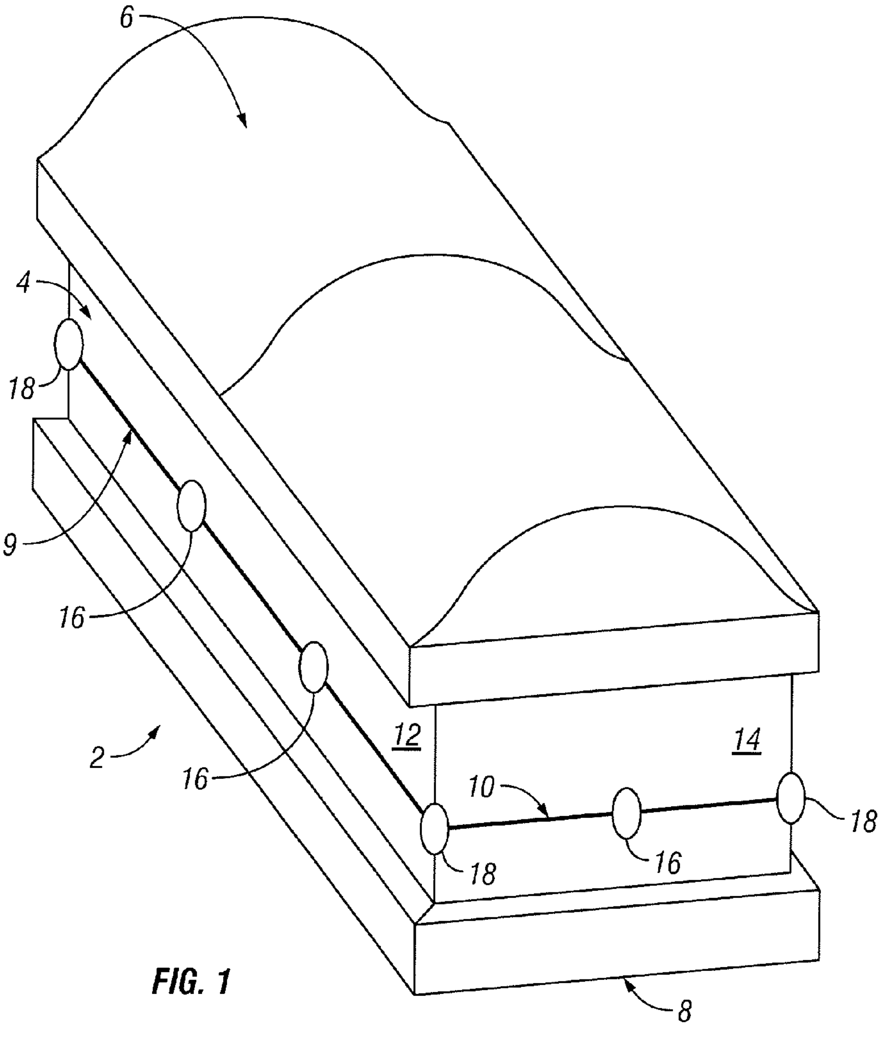
FIG. 1 is a perspective view of a casket with hardware and bars attached thereto.

A perspective view of a casket 2 is shown in FIG. 1. This casket comprises a box portion 4 and 8 and the lid portion 6. Bars 9 and 10 are spaced apart from the side and surfaces 12 and 14, respectively, and provide a grip for carrying casket 2. Bars 9 and 10 couple to casket 2 in the vicinity of decorative hardware trims 16 and 18.

Figure 2C:
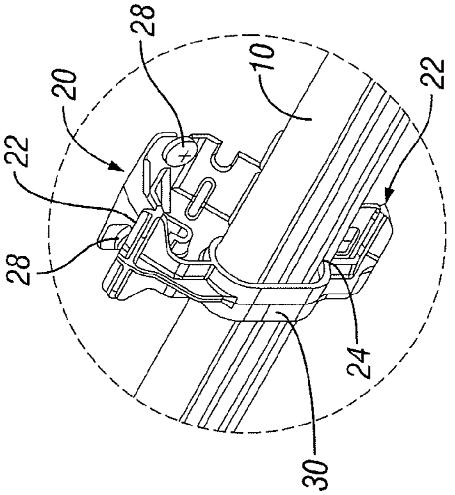
FIGS. 2*a* through *c* are perspective detail views of a portion of the casket and hardware bracket.
Figure 2B:
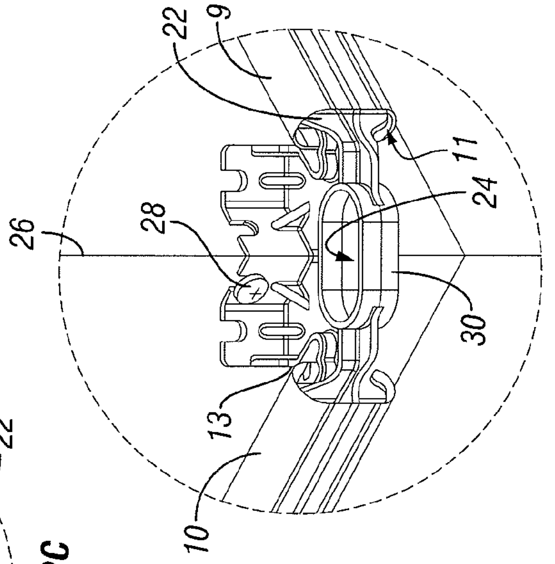
Figure 2A:
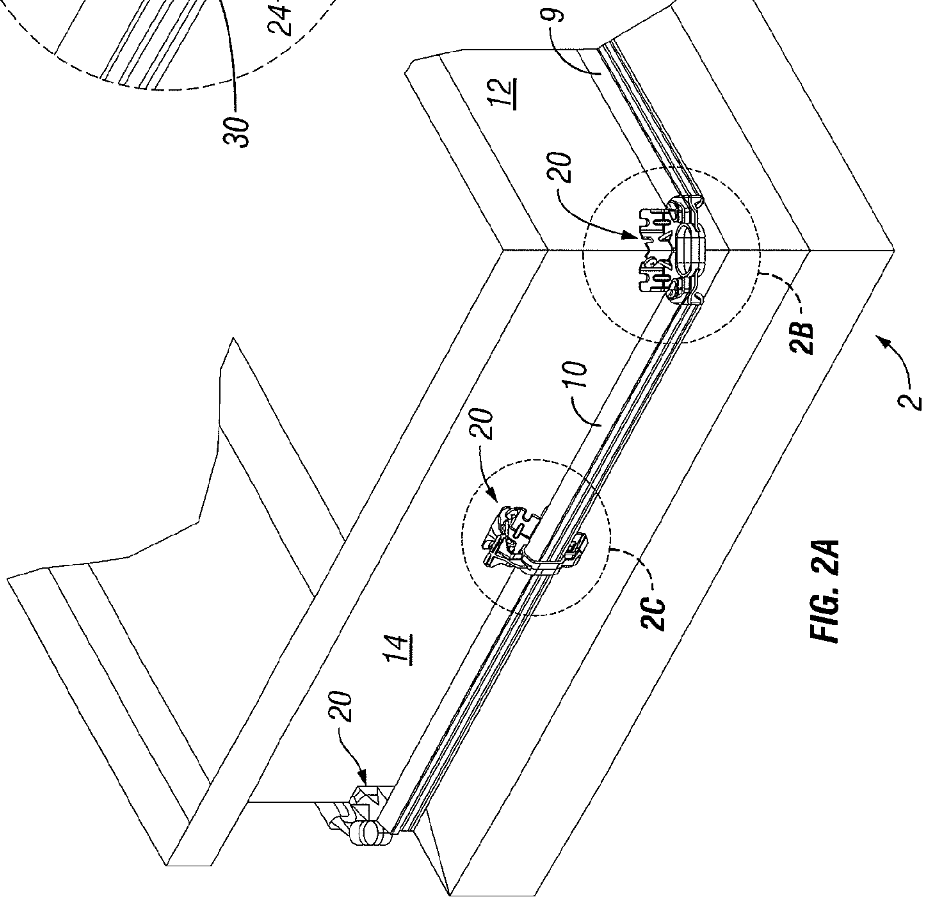

The several views of FIGS. 2*a-c* show bars 9 and 10 attached to casket mounting bracket 20. Typically, bars 9 and 10 are hollow cylinders. Accordingly, casket mounting bracket 20 may be configured with extending tabs 22 (see, also, FIG. 3) that insert into bars 9 and 10. Maintaining consistency with conventional casket appearance, mounting bracket 20 can be placed at the center of the side surfaces 12 and end surfaces 14, and the corners of casket 2 to further assist carrying bars 9 and 10. In an embodiment, bracket 20 includes a through bore 24 (see, also, FIG. 3) through which bar 9 or 10 passes. Because bracket 20 is fastened to casket 2, it carries the load from bars 9 and 10 when casket 2 is lifted. The detail view in FIG. 2*c* shows how bars 9 or 10 can pass through bore 24 formed by wall member 30 of bracket 20. The view of FIG. 2*c* also shows fasteners 28 attaching to casket 2 having the effect of securing both bracket 20 and bars 10 or 9 thereto.

As illustratively shown, changing the orientation of bracket 20 from that shown in FIG. 2*b* allows bracket 22 to hold a bar by a wall member 30. The view shown in FIG. 2*b* demonstrates how tabs 22 are inserted into the hollow portions 11 and 13 of bars 9 and 10, respectively. Bracket 20 can also be configured to be placed on corner 26 of casket 2. This allows a single bracket to couple to both bars 9 and 10 oriented perpendicular to each other. This view also shows an illustrative fastener 28 that attaches bracket 20 to casket 2.

FIGS. 3*a* through *d* show various views of bracket 20. As shown in the perspective view of FIG. 3*a*, bracket 20 includes tabs 22, bore 24, and opposing flanges 32 and 34. Illustratively, notches 36 are disposed on the ends of flanges 32 and 34 to receive fastener 28 as shown in FIGS. 2*b* and *c*, for example. It is appreciated that this bracket can be illustratively a monolithic molded or other similar fabricated/processed part; the bracket being made from polycarbonate or other structurally sound plastics or even out of metal. In the illustrative embodiment shown herein, braces 38 may be included to add structural integrity to bracket 20 when in use. The side elevation view of FIG. 3*b* demonstrates how flanges 32 and 34 extend from bracket 20. It is contemplated that the sizes of flanges 32 and 34 can be varied and may include or not include braces 38 depending on the structural loads required. This may also be influenced by the material used to make the bracket 20.

Figure 3A:
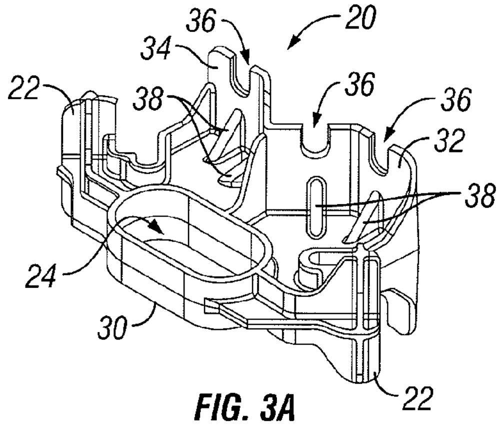
FIGS. 3*a* through *d* show various views of a hardware bracket for the casket of FIG. 1.
Figure 3B:
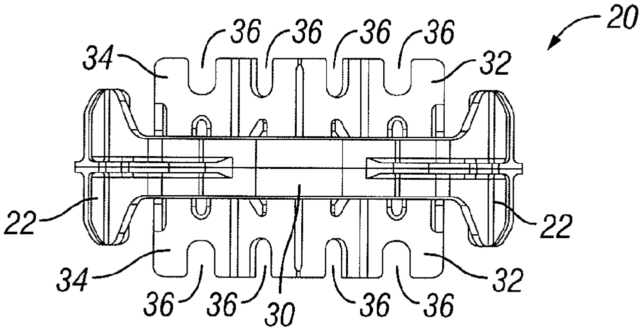
Figure 3C:
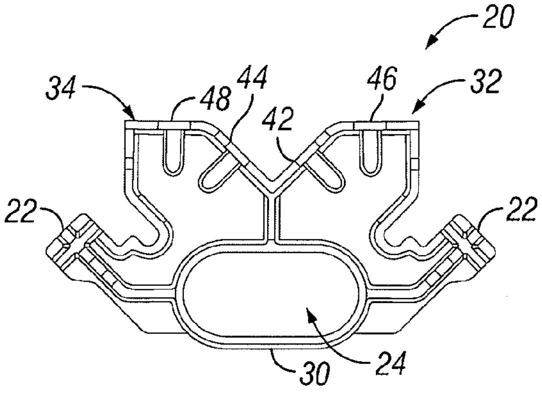

The top view of bracket 20 shown in FIG. 3*c* demonstrates versatility in this illustrative embodiment wherein bracket 20 can be used on both casket corners and wall surfaces. For example, flanges 32 and 34 include angled surface portions 42 and 44, respectively. In this illustrative embodiment, the angle between portions 42 and 44 are about 90 degrees with respect to each other. This allows the bracket to fit onto corner 26 as shown on FIG. 2*b*. Tabs 22 are similarly oriented at about 90 degrees with respect to each other. When bracket 20 is fastened a corner of casket 2, one of the tabs 22 engages one bar extending along one side of the casket, while the other tab 22 engages another bar perpendicularly oriented to the bar. Again, this is shown in FIG. 2*b*.

Surfaces 46 and 48 on flanges 32 and 34, respectively, can also attach to casket 2. As shown in FIG. 2*c*, changing the orientation of bracket 20 with respect to bar 10 allows bracket 22 to carry bar 10. Surfaces 46 and 48 are co-linear, so along with notches 36, bracket 20 can be fastened to casket 2. The net result is this same bracket can be oriented in different ways to attach to the casket at different locations to perform different tasks.

Figure 3D:
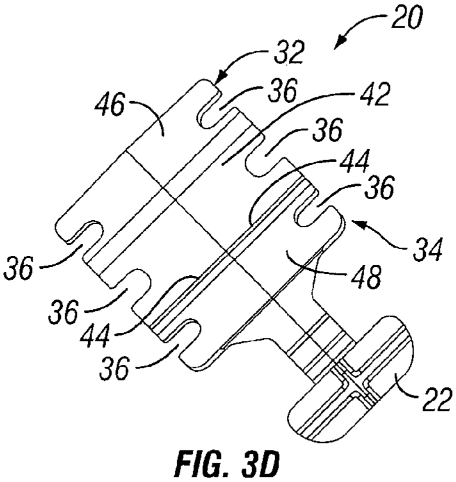

The view in FIG. 3*d* shows an illustrative embodiment of tab 22 extending from bracket 20. Illustratively, tab 22 may have a body that conforms, as necessary, to the interior of hand bars 9 and 10. It is further contemplated that tabs 22 may attach to the exterior or end of the rails as desired. This view also shows surfaces 48, 46, 44, and 42 of flanges 34 and 32, respectively, further demonstrating the location of notches 36 on both sides of flanges 32 and 34.

Figure 4A:
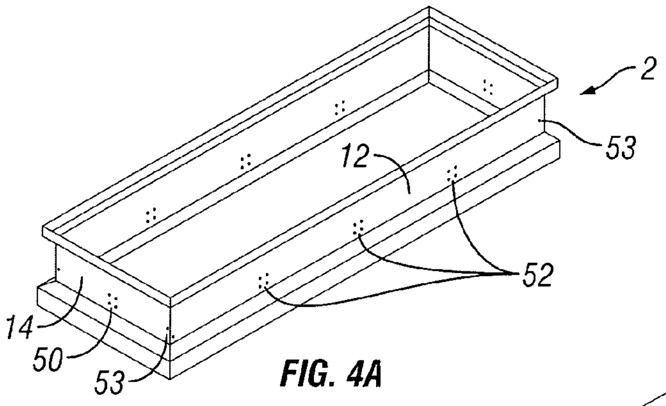
FIGS. 4*a* through *e* are various views of a casket with pilot holes drilled therein.
Figure 4B:
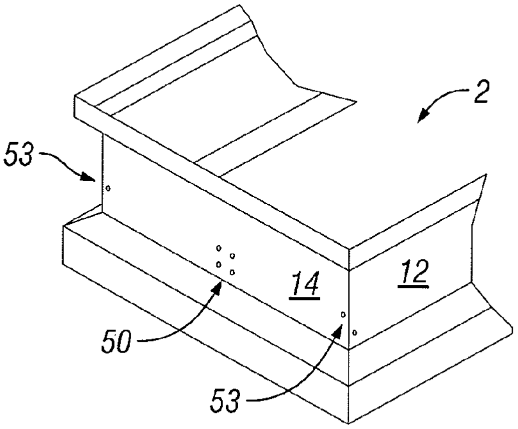
Figure 4C:
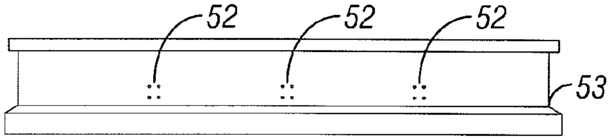
Figure 4D:
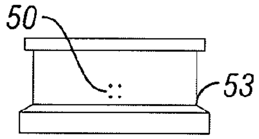
Figure 4E:
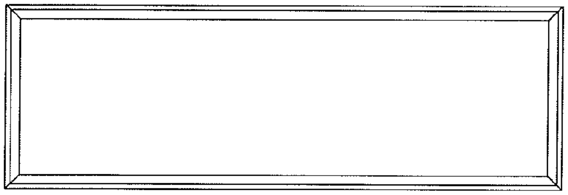

FIGS. 4*a-e* and 5*a-c* are several views of a casket with pilot holes drilled therein indicating where a bracket 20 can be attached. As shown in the views of FIGS. 4*a-c*, rather than requiring a custom build of each individual casket, casket 2 simply requires pilot hole sets 50, 52, and 53 bore at the same location on the caskets as illustratively shown. With the bracket 20 attached to casket 2 and bars 9 and 10 (see FIGS. 1 and 2), decorative modular casket hardware covers can be placed over the brackets. These decorative covers can be of any style and configuration desired for a particular look of the casket at any particular time. Modularizing the bars and brackets allow a more efficient manufacturing and customizing experience.

Figure 5C:
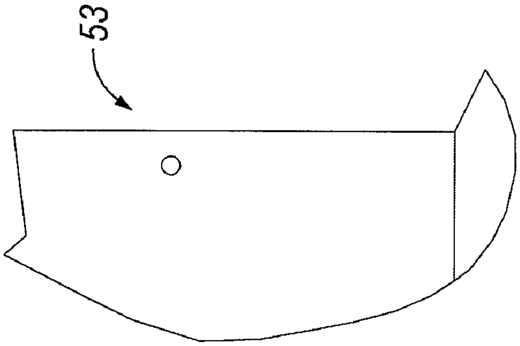
FIGS. 5*a* through *c* are views of pilot holes drilled into the casket as shown in FIGS. 4*a* through *e;*
Figure 5B:
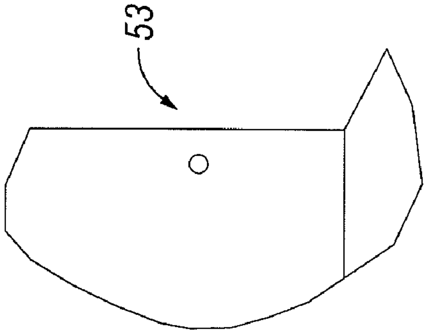
Figure 5A:
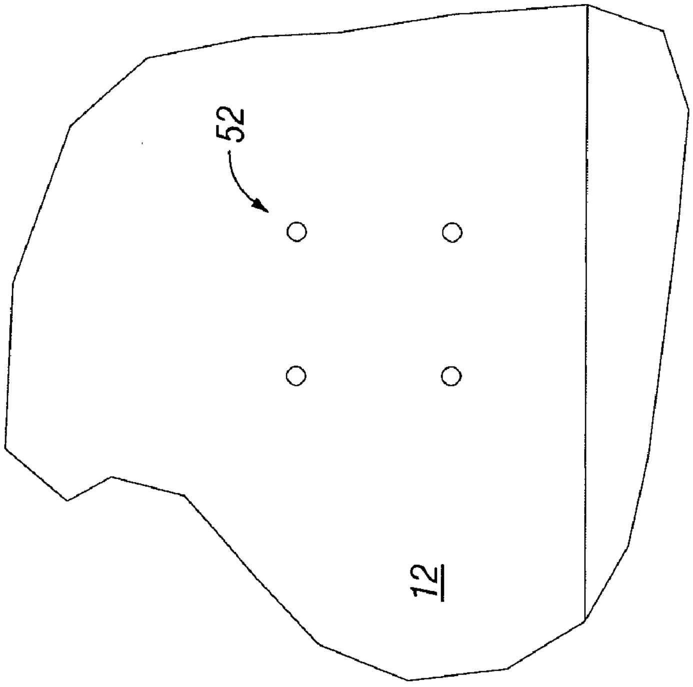

The detail views in FIGS. 5*a-c* depict the pilot hole configurations shown in FIGS. 4*c* and *d*. For example, in FIG. 5*a*, four illustrative pilot holes are made to accommodate four fasteners that attach surfaces 46 and 48 of bracket 20 onto the wall of casket 2. Illustratively, at the corners of casket 2, as shown in FIGS. 5*b* and *c*, pilot holes are made so that surfaces 42 and 44 can attach to the perpendicular walls of casket 2.

Figure 6B:
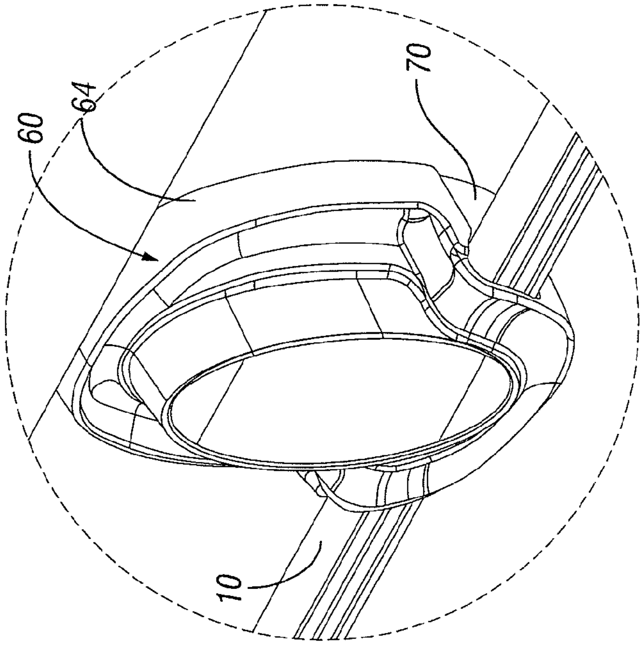
FIGS. 6*a* and *b* are perspective and perspective detail views of a decorative bracket cover for use on the casket.
Figure 6A:
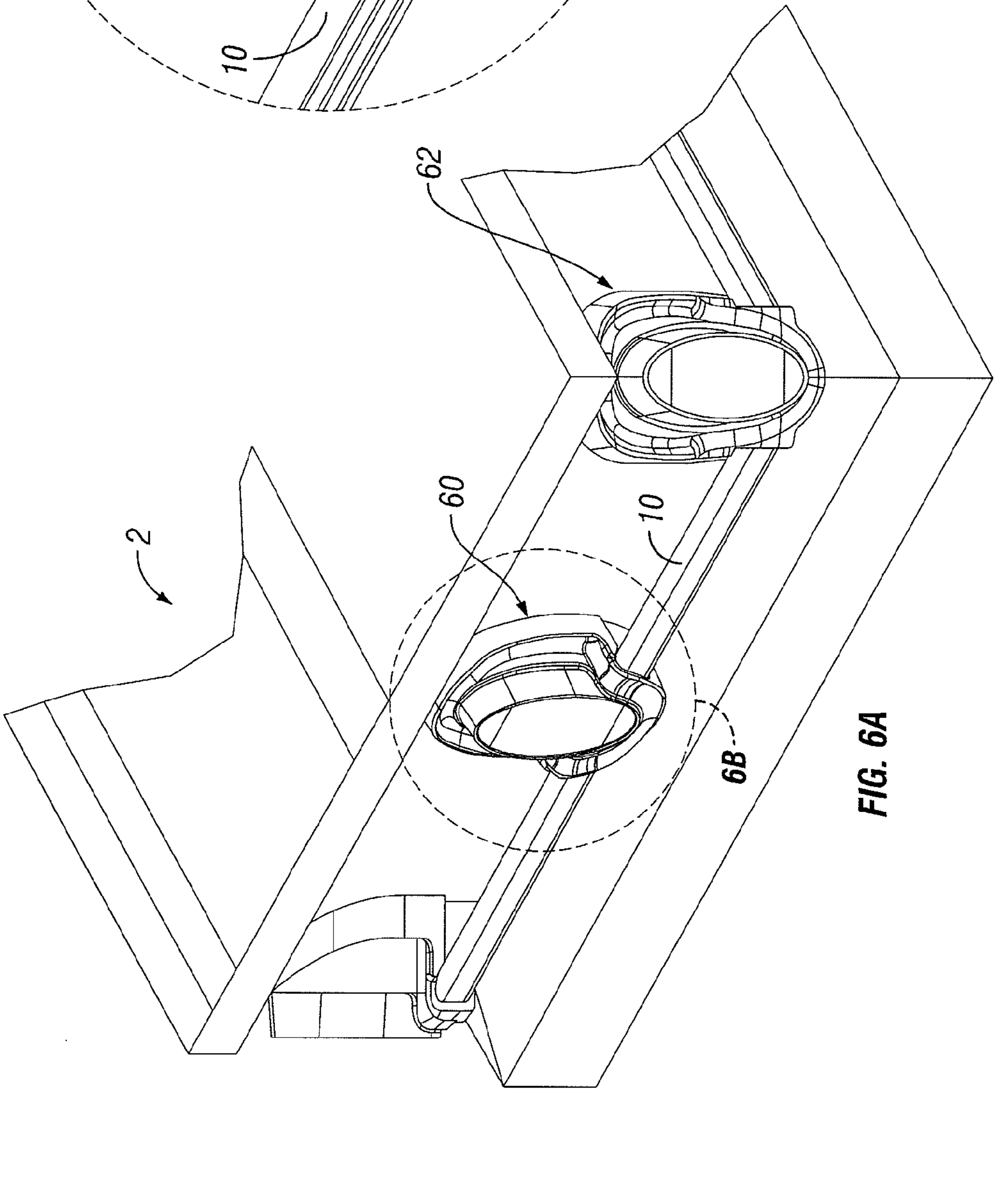

Perspective and detail views of an illustrative decorative modular bracket cover assemblies 60 and 62 on casket 2 are shown in FIGS. 6*a* and *b*. Comparing the view in FIG. 6*a* to that of FIG. 2*a*, it is easily seen how the decorative modular bracket cover assemblies 60 and 62 shroud bracket 20. These cover assemblies 60 and 62 are comparable to the decorative trims 16 and 18 shown in FIG. 1. In an illustrative embodiment, neither cover assembly 60 nor 62 are configured to carry a load, but rather hide bracket 20 for esthetic purposes. It is contemplated that the design, color, make, material attachment means of cover assemblies 60 and 62 can vary depending on the desired look of the casket 2. Because these assemblies are not load bearing but simply shroud bracket 20, they can be added at any time after assembly. This allows a customer to choose from an almost unlimited variety of these decorative assemblies and have it assembled at the funeral home or distributor rather than at a custom manufacturer.

Figure 7A:
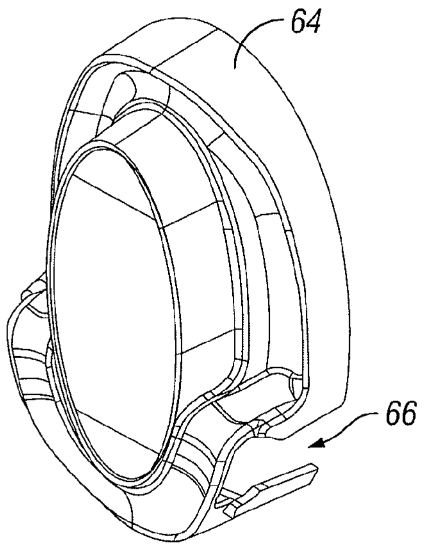
FIGS. 7*a* through *d* show perspective, front, side, and top views of a face plate portion for use on the bracket cover assembly.
Figure 7B:
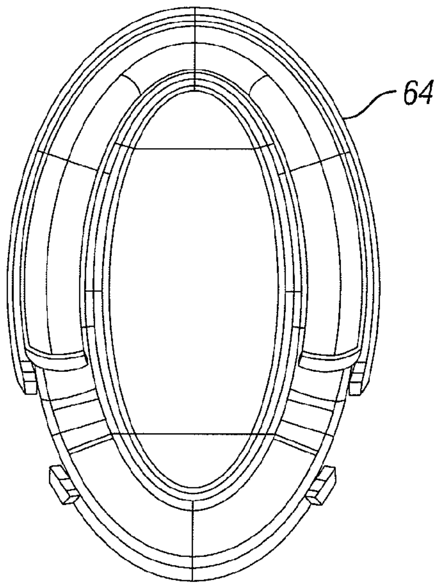
Figure 7C:
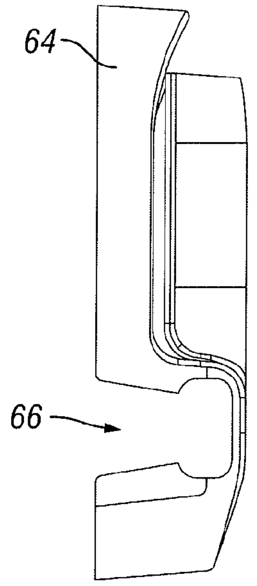
Figure 7D:
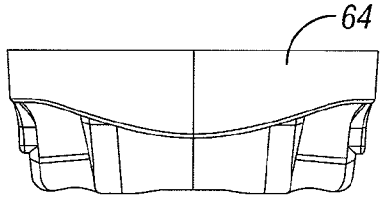
Figure 8A:
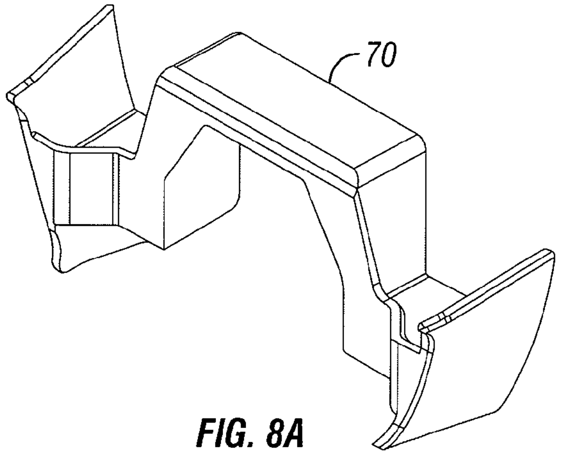
FIGS. 8*a* through *d* are perspective lower, side, and top views of a back filler portion illustratively used in conjunction with the face plate portion of FIG. 7*a* through *d;*
Figure 8B:
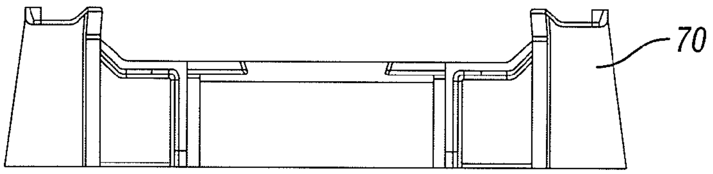
Figure 8C:
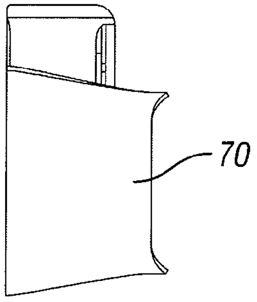
Figure 8D:
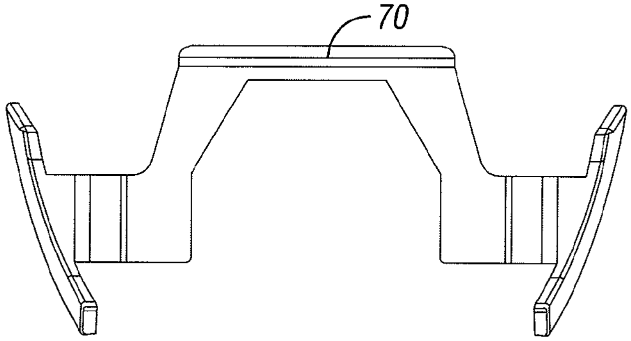
Figure 9A:
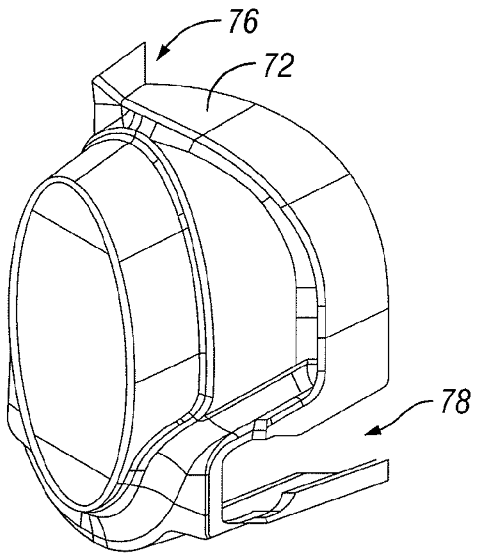
FIGS. 9*a* through *d* are several views of an illustrative embodiment of a bracket cover for use in conjunction with the bracket.
Figure 9B:
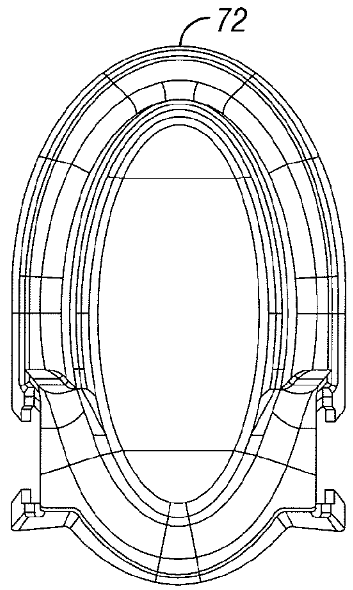
Figure 9C:
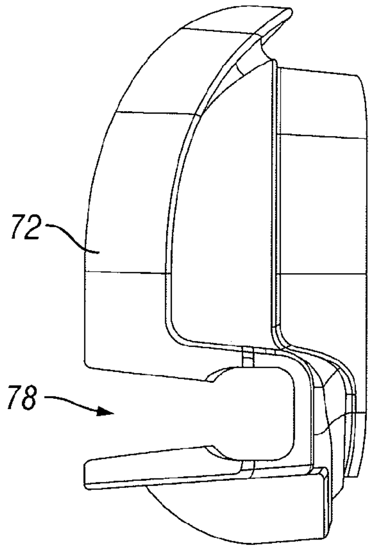
Figure 9D:
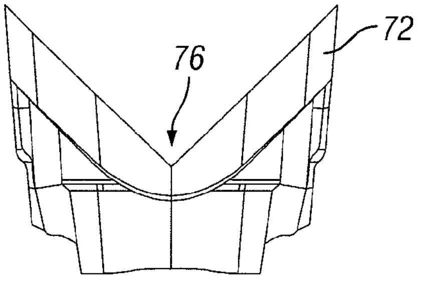
Figure 10A:
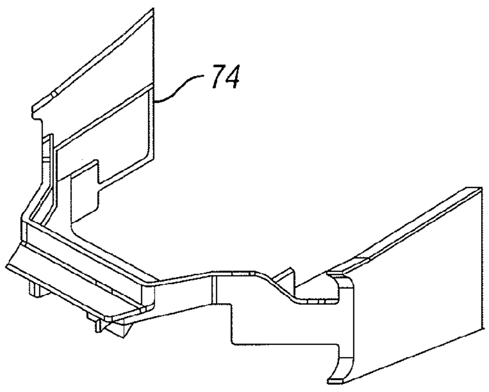
FIGS. 10*a* through *d* are views of an illustrative embodiment of a back filler for use with the bracket cover.
Figure 10B:
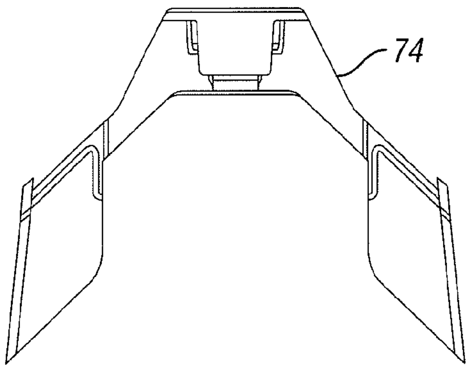
Figure 10C:
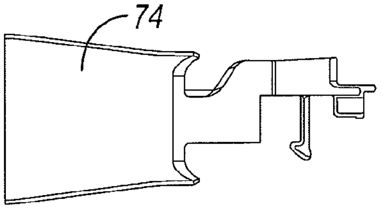
Figure 10D:
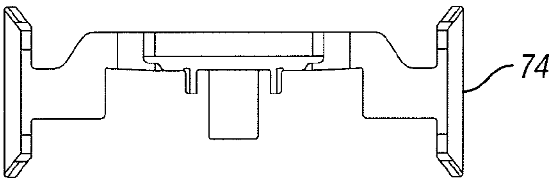
Figure 11A:
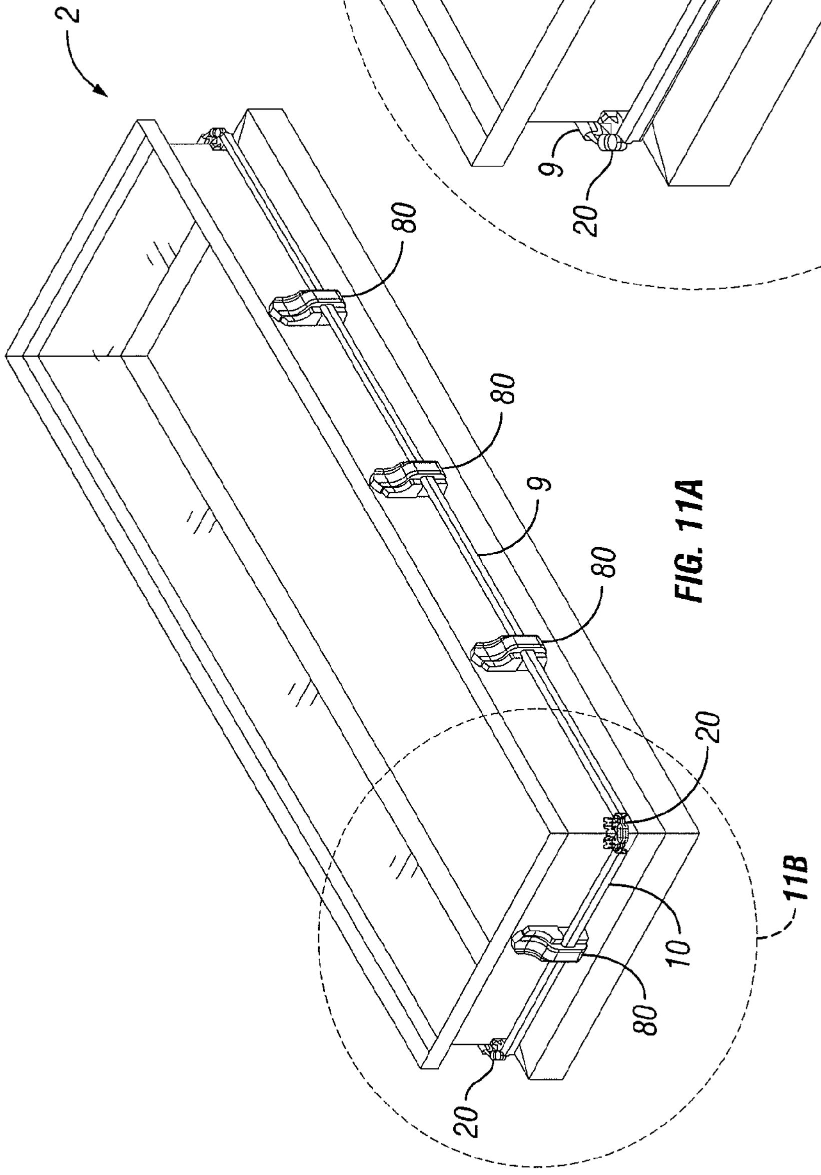
FIGS. 11*a* through *e* are various views of a casket showing another illustrative embodiment of casket hardware.
Figure 11B:
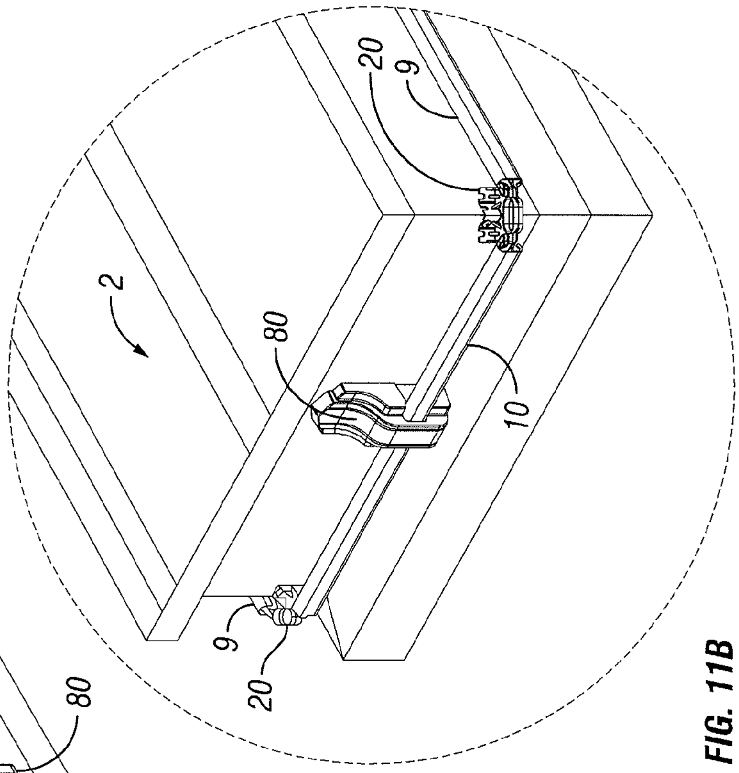
Figure 11D:
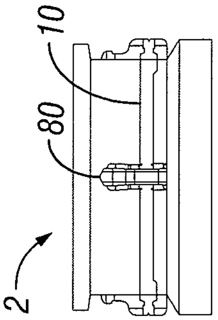
Figure 11C:
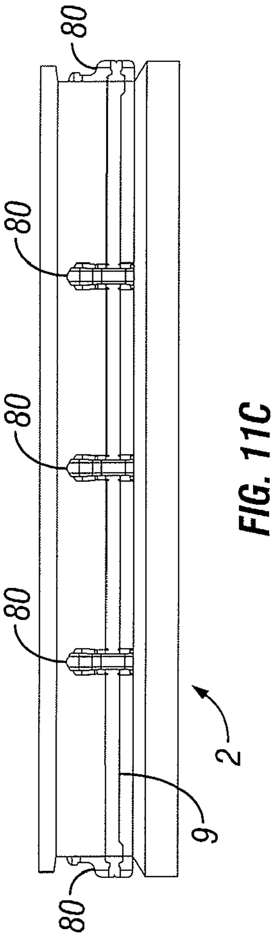
Figure 11E:
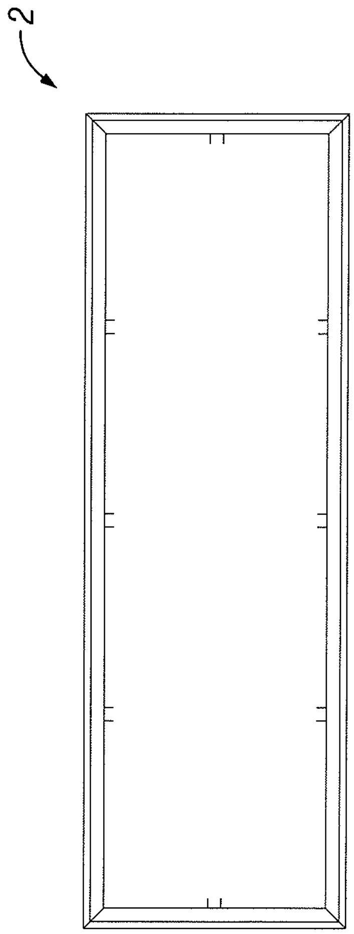
Figure 12B:
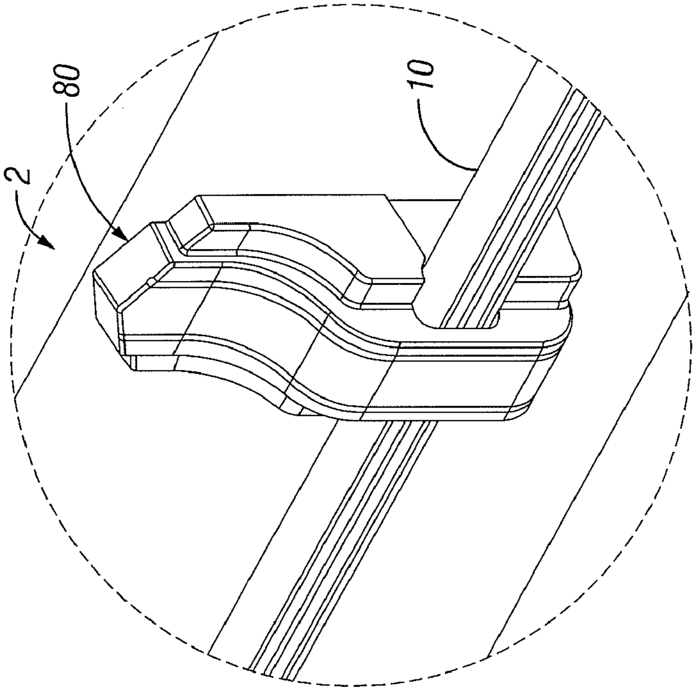
FIGS. 12*a* and *b* are perspective and perspective detail views of a portion of the casket with the hardware shown in FIGS. 11*a* through *d;*
Figure 12A:
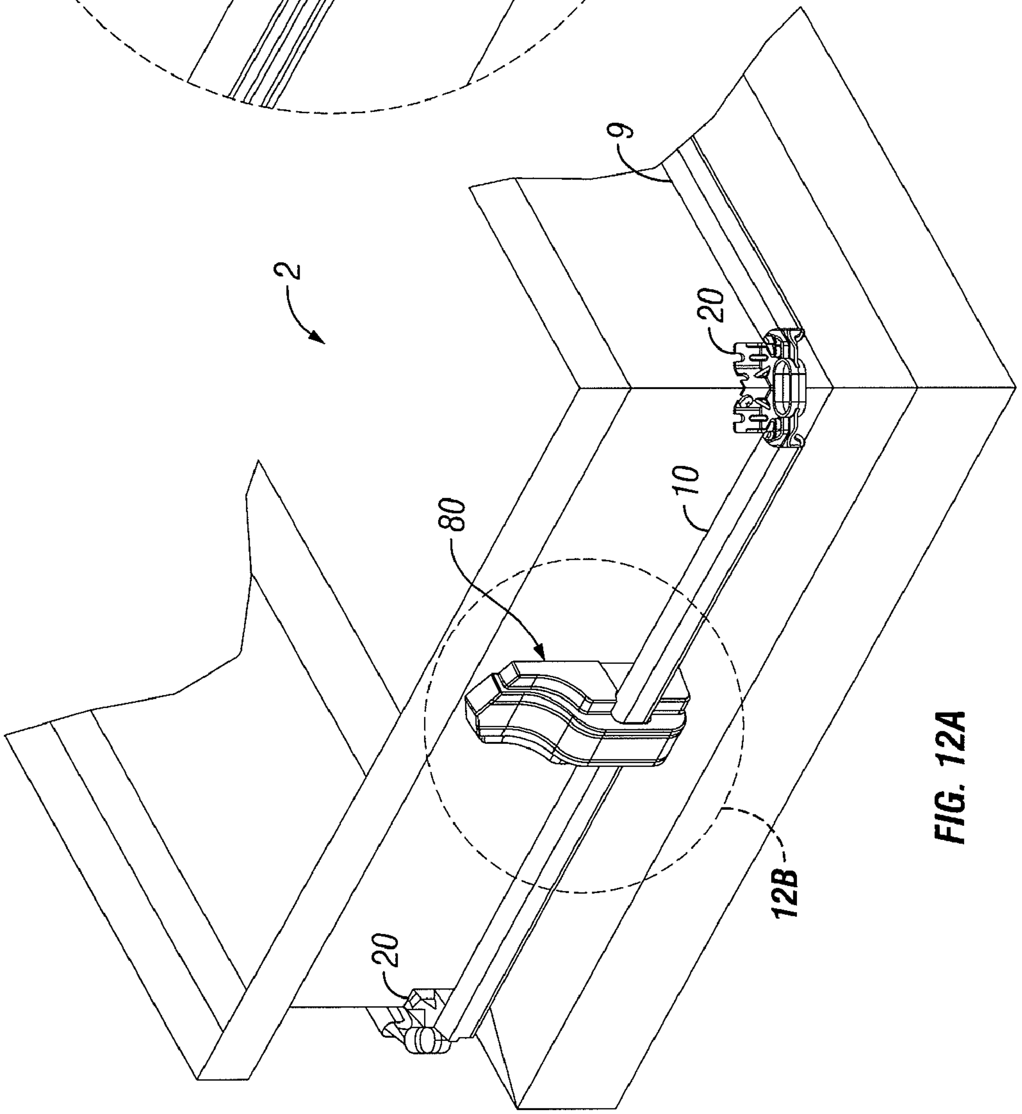
Figure 13A:
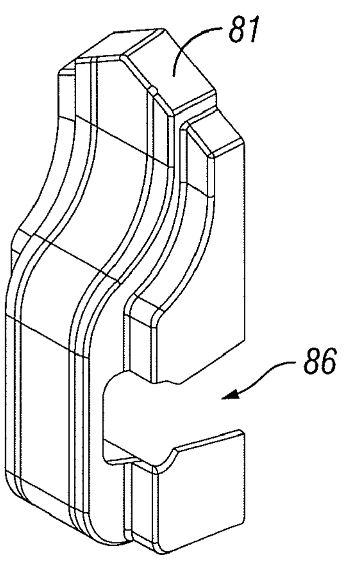
FIGS. 13*a* through *d* show various views of the illustrative embodiment of the face plate used in the embodiment shown in FIGS. 11*a* through *e* and 12*a* through *d*.
Figure 13B:
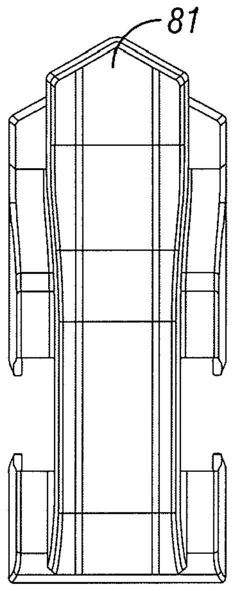
Figure 13C:
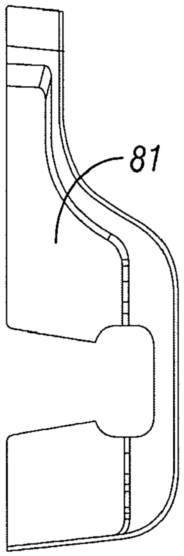
Figure 13D:
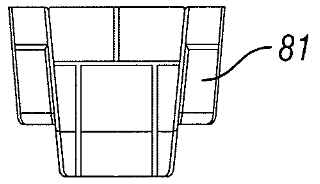
Figure 14A:
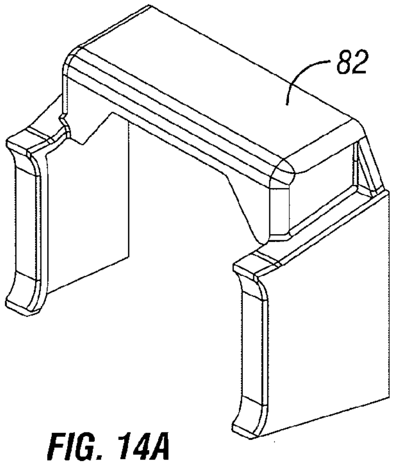
FIGS. 14*a* through *d* are various views of a back filler used in conjunction with the face plate shown in FIG. 13.
Figure 14B:
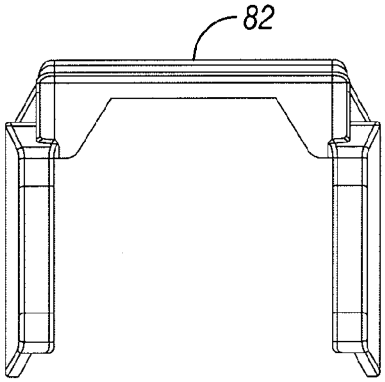
Figure 14C:
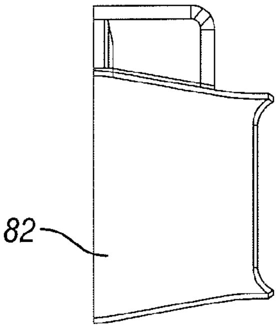
Figure 14D:
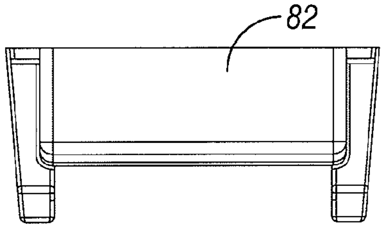

The several views of FIGS. 7*a-d* show perspective, front, side, and top views of a face plate portion 64 of decorative modular bracket cover assembly 60. Face plate 64 illustratively includes an opening 66 as shown in FIGS. 7*a* and *c* configured to receive either bars 9 or 10. It is evident from these views how cover assembly 60 shrouds bracket 60 from view while offering an esthetically pleasing trim piece.

In an illustrative embodiment, assembly 60 may also comprise a back filler portion 70 in addition to a face plate 64, as shown in FIGS. 8*a-d*. Back filler 70 illustratively fits underneath and behind face plate 64 and bar 10. As the name implies, back filler 70 serves to complete the look of decorative modular bracket cover assembly 60 and further assists shrouding bracket 20. It is contemplated that in other embodiments, a single piece shroud or cover could be used to conceal bracket 20. FIGS. 9*a-d* and 10*a-d* are several views of face plate 72 and back filler 74 that make up decorative modular bracket cover assembly 62. In this illustrative embodiment, face plate 72 is a similar design to face plate 64 of FIG. 7, but configured to be located on a corner of casket 2. A right angled notch 76, similar to that formed by surfaces 42 and 44 of bracket 20, allows cover assembly 62 to cover the corner of the casket and shroud bracket 20. See, also FIG. 2*b*. Face plate 72 further includes an opening 78, similar to opening 66 of face plate 64. Again this opening allows the bar to pass through base plate 72. It is appreciated that openings such as 66 and 78 can be configured differently on alternate bracket cover assemblies. Because the design of such cover assemblies can be numerous, so too is the exact position of the openings with the respect to the face plate, or even back filler for that matter.

Demonstrating the variety of cover configurations that can be employed, FIGS. 11*a-e*, 12*a* and *b*, 13*a-d*, and 14*a-d* show various views of casket 2 with bars 9 and 10 connected thereto by bracket 20 and an alternate embodiment of a decorative modular bracket cover assembly 80. A difference between cover assembly 80 and 60 is the ornamental design. The detail views of decorative modular bracket cover assembly 80 on casket 2 shown in FIGS. 12*a* and *b* demonstrate this. The views of FIGS. 13*a-d* and 14*a-d* show various views of face plate 81 and back filler 82. Similar to face plate 64, face plate 80 includes opening 86 configured to receive bar 10. The look of decorative modular bracket cover assembly 80 can be strikingly different from assembly 60 shown in FIG. 6, yet serve the same purpose of shrouding bracket 20.

This module casket hardware allows the ability to manufacture and transport caskets with a bracket that holds a stationary bar to a casket with the ability to add decorative pieces to cover the brackets. Again, the decorative modular hardware bracket cover can be added at any point along the supply chain including but not limited to the manufacturing, distribution and funeral homes. Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A casket hardware comprising:

a bracket configured to attach to a casket corner and a casket wall surface and configured to engage and support a casket bar, wherein the bracket comprises:

first and second tabs each spaced apart from each other and each positioned non-parallel to each other;

wherein the first and second tabs each have a body that is configured to at least partially fit inside a portion of the casket bar;

wherein the bracket includes a bore formed between the first and second tabs and disposed through the bracket, the bore having a periphery separating the first and second tabs;

wherein the bore is sized to received the casket bar such that the casket bar is extendable through one side of the bracket to the other side of the bracket;

first and second flanges spaced apart from the bore, each of the first and second flanges includes a casket wall attachment surface, wherein each wall attachment surface is positioned co-linear to the other wall attachment surface such that both wall attachment surfaces are configured to permit the bracket to attach to the casket wall surface;

wherein the first and second flanges include receptacles configured to receive a fastener to attach the bracket to the casket wall surface;

third and fourth flanges spaced apart from the bore, each of the third and fourth flanges includes a casket corner attachment surface, wherein the corner attachment surface of the third flange angularly abuts the corner attachment surface of fourth flange and the wall attachment surface of the first flange, and the casket corner attachment surface of the fourth flange angularly abuts the wall attachment surface of the second flange;

wherein the casket corner attachment surfaces of the third and fourth flange abut each other at about a 90 degree angle forming a cavity;

wherein the cavity is configured to receive the casket corner;

wherein the third and fourth flanges include receptacles each configured to receive a fastener to attach the bracket to the casket corner;

wherein the bracket is configured to be oriented with respect to the casket in a first orientation to attach to the casket wall and a second orientation which is about perpendicular to the first orientation to attach to the casket corner;

wherein the bore in the bracket is configured to receive a casket bar when in the first orientation; and wherein the tabs are configured to at least partially fit within a portion of the casket bar when the bracket is oriented in the second orientation.

2. The casket hardware of claim 1, wherein the bracket is a monolithic molded part.

3. The casket hardware of claim 1, wherein the bracket is made from plastic or metal.

4. The casket hardware of claim 1, wherein the first, second, third, and fourth flanges each further comprise at least one brace to add structural integrity to the bracket.

5. The casket hardware of claim 1, further comprising a decorative modular bracket cover assembly which includes a face plate which fits over the bracket and a portion of at least one casket bar.

6. The casket hardware of claim 5, wherein the decorative modular bracket cover assembly further comprises a back filler portion configured to position adjacent the bracket and the face plate.

7. A casket hardware comprising:

a bracket configured to attach to a casket corner and a casket wall surface and configured to engage and support a casket bar, wherein the bracket comprises:

first and second tabs each spaced apart from each other and each positioned non-parallel to each other;

wherein the first and second tabs each have a body that is configured to at least partially fit inside a portion of the casket bar;

wherein the bracket includes a bore formed between the first and second tabs and disposed through the bracket, the bore having a periphery separating the first and second tabs;

wherein the bore is sized to received the casket bar such that the casket bar is extendable through one side of the bracket to the other side of the bracket;

first and second flanges spaced apart from the bore, each of the first and second flanges includes a casket wall attachment surface, wherein each wall attachment surface is positioned co-linear to the other wall attachment surface such that both wall attachment surfaces are configured to permit the bracket to attach to the casket wall surface;

wherein the first and second flanges include receptacles configured to receive a fastener to attach the bracket to the casket wall surface;

third and fourth flanges spaced apart from the bore, each of the third and fourth flanges includes a casket corner attachment surface, wherein the corner attachment surface of the third flange angularly abuts the corner attachment surface of fourth flange and the wall attachment surface of the first flange, and the casket corner attachment surface of the fourth flange angularly abuts the wall attachment surface of the second flange;

wherein the casket corner attachment surfaces of the third and fourth flange abut each other at about a 90 degree angle forming a cavity;

wherein the cavity is configured to receive the casket corner;

wherein the third and fourth flanges include receptacles each configured to receive a fastener to attach the bracket to the casket corner;

wherein the bracket is configured to be oriented with respect to the casket in a first orientation to attach to the casket wall and a second orientation which is about perpendicular to the first orientation to attach to the casket corner;

wherein the bore in the bracket is configured to receive a casket bar when in the first orientation; and wherein the tabs are configured to at least partially fit within a portion of the casket bar when the bracket is oriented in the second orientation; and a bracket cover assembly which includes a face plate; wherein the face plate fits over the bracket and a portion of at least one casket bar;

wherein the face plate includes an opening to receive the portion of the casket bar.

8. The casket hardware of claim 7, wherein the bracket cover assembly further comprises a back filler portion configured to position adjacent the bracket and the face plate.

9. The casket hardware of claim 7, wherein the face plate includes a plurality of axially aligned openings each configured to receive at least a portion of at least one casket bar.

* * * * *